Figure 1:
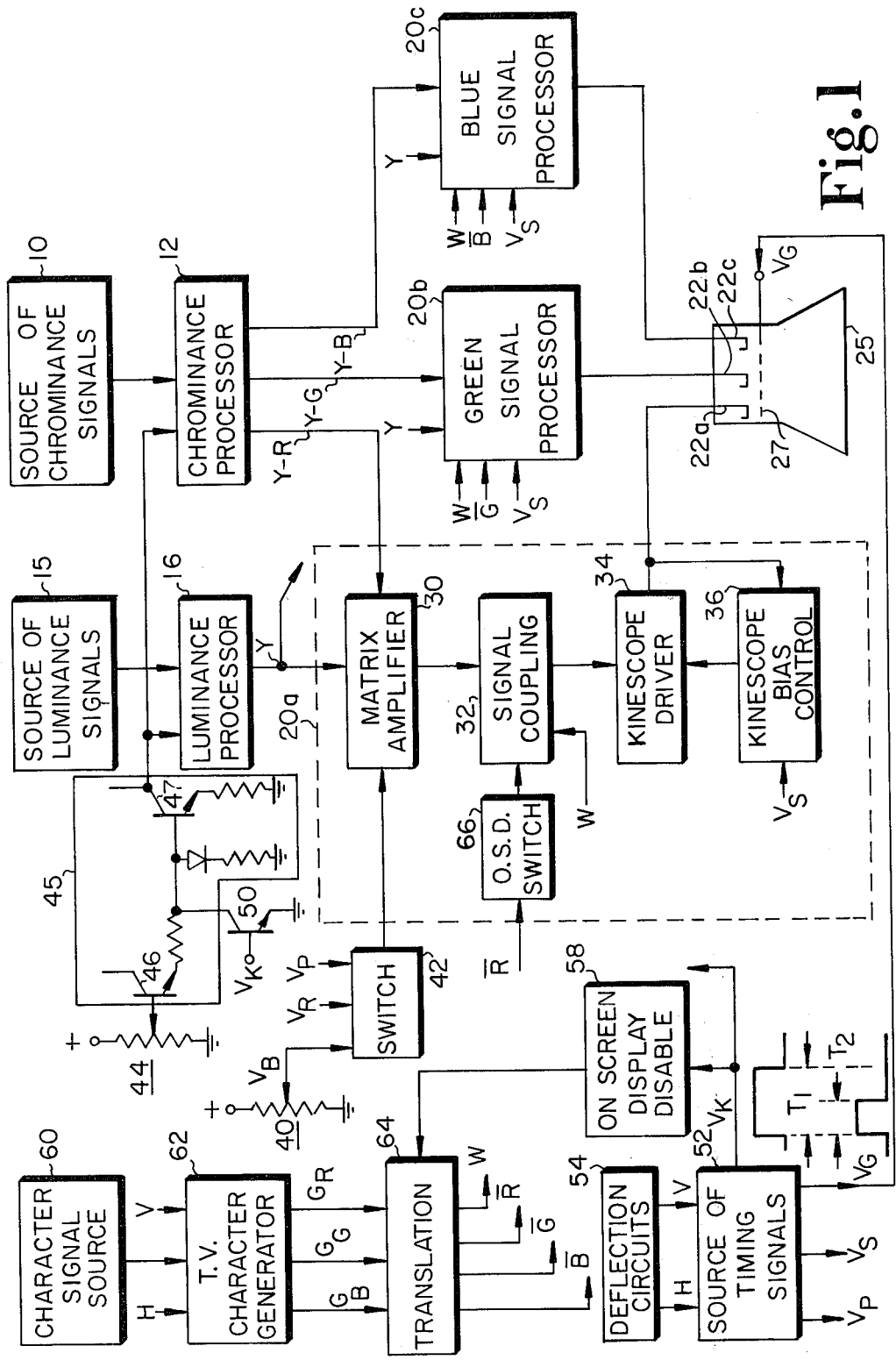

United States Patent [19]

Harwood et al.

[11] 4,435,729

[45] Mar. 6, 1984

[54] TELEVISION RECEIVER WITH SELECTIVELY DISABLED ON-SCREEN CHARACTER DISPLAY SYSTEM

[75] Inventors: Leopold A. Harwood, Bridgewater, N.J.; Robert L. Shanley, II, Indianapolis, Ind.

[73] Assignee: RCA Corporation, New York, N.Y.

[21] Appl. No.: 352,884

[22] Filed: Feb. 26, 1982

[51] Int. Cl.³ .............................................. H04N 5/22
[52] U.S. Cl. ..................................... 358/183; 340/726
[58] Field of Search .................. 358/22, 183; 340/726, 340/723

[56] References Cited

U.S. PATENT DOCUMENTS

| | | | |
|---|---|---|---|
| 3,891,792 | 6/1975 | Kimura | 358/183 |
| 3,898,644 | 8/1975 | Bayter | 358/183 |
| 3,911,420 | 10/1975 | Lampson | 358/183 |
| 3,984,828 | 10/1976 | Beyers | 340/324 AD |
| 4,021,841 | 5/1977 | Weinger | 358/183 |
| 4,345,246 | 8/1982 | van den Driessche | 358/183 |

OTHER PUBLICATIONS

Schematic Circuit Diagram of a Portion of the Signal Processing System of the Metz Color Television Receiver, Chassis 681 G.
"Digital Integrated Electronics" (Taub and Schilling), p. 452 McGraw Hill 1977.
"Analysis and Design of Integrated Electronic Circuits" (Chirlian) p. 133, Harper and Row, 1981.

Primary Examiner—Michael A. Masinick
Attorney, Agent, or Firm—Eugene M. Whitacre; P. J. Rasmussen; R. H. Kurdyla

[57] ABSTRACT

A television receiver includes a character generator for permitting kinescope display of auxiliary characters in addition to display of normal video signal information, and means for sensing a given characteristic (e.g., bias) of video signal processing circuits of the receiver during prescribed sensing intervals. The character generator is disabled during the sensing intervals to prevent false outputs from the character generator from distorting the characteristic being sensed.

5 Claims, 3 Drawing Figures

TELEVISION RECEIVER WITH SELECTIVELY DISABLED ON-SCREEN CHARACTER DISPLAY SYSTEM

This invention concerns a television receiver or equivalent video signal processing and image reproducing system including provision for enabling on-screen kinescope display of auxiliary characters in addition to normal video signal information. In particular, the invention concerns such a system wherein normal operation of the character signal generator is modified during intervals when a given characteristic of the video signal processing system is being monitored.

A television receiver including a character signal generator for enabling "on-screen" display of auxiliary characters is capable of displaying auxiliary character information such as alphanumerics representative of channel number, time of day, subtitles and data displays, in addition to displaying normal video information derived from a received composite television signal. Such character displays are typically generated by replacing normal video information with appropriately horizontally and vertically synchronized character representative signals developed by a suitable character generator associated with the receiver, so that the characters are displayed on a given portion of the kinescope screen of the receiver. One system of this type is described in U.S. Pat. No. 3,984,828—Beyers.

Some receivers also include an automatic kinescope bias (AKB) control system for automatically controlling kinescope bias, in order to establish the proper blanking current levels for each of the electron guns of the kinescope. Such automatic bias control prevents reproduced picture colors and the gray scale response of the kinescope from being adversely affected when the bias of the kinescope guns varies from a desired level (e.g., due to aging and temperature effects). One type of AKB control system is disclosed in U.S. Pat. No. 4,263,622 of Werner Hinn.

Such AKB system operates during image retrace blanking intervals, at which time the kinescope conducts a black level current in the vicinity of kinescope cut-off. The kinescope black level current is very small (on the order of a few microamperes), and is monitored by the AKB system to generate a correction voltage representative of the difference between the sensed black current and a desired black current level. The correction voltage is applied to video signal processing circuits preceding the kinescope with a sense for reducing the difference.

It is herein recognized that the on-screen display character generator system can be caused to produce false character output signals due to false triggering of the character generator in response to spurious signals such as, for example, stray magnetic field voltages generated by deflection circuits within the receiver. Such stray voltages are particularly strong during horizontal and vertical retrace intervals, and can be picked by wiring associated with the on-screen display system (i.e., between the character generator and video signal processing circuits which receive the character representative signals). The character generator system also can be caused to produce false character signals in response to signals associated with an auxiliary input signal source associated with the receiver (e.g., a source of Teletext signals). Signals from the auxiliary source may include retrace interval timing signals for synchronizing the operation of receiver timing circuits, as well as unwanted spurious signals. False character signals can distort the level of the kinescope black current being sensed by the AKB system, causing the AKB system to produce an erroneous bias correction signal.

It is furthermore herein recognized that false character signals can distort the video signal black reference level which occurs during each horizontal image retrace interval of the video signal. In receivers including keyed clamps which sense the black reference level and operate to maintain a desired black reference level, improper clamping action will result when the sensed video signal black level is distorted by false character signals.

Therefore, in accordance with the present invention, the operation of the auxiliary on-screen display system is disabled during times when a given characteristic of the video signal processing system, such as kinescope bias or video signal black reference level, is being monitored.

In one embodiment of the invention, the on-screen display system is disabled when kinescope bias is being monitored by an automatic kinescope bias control network.

Figure 2:
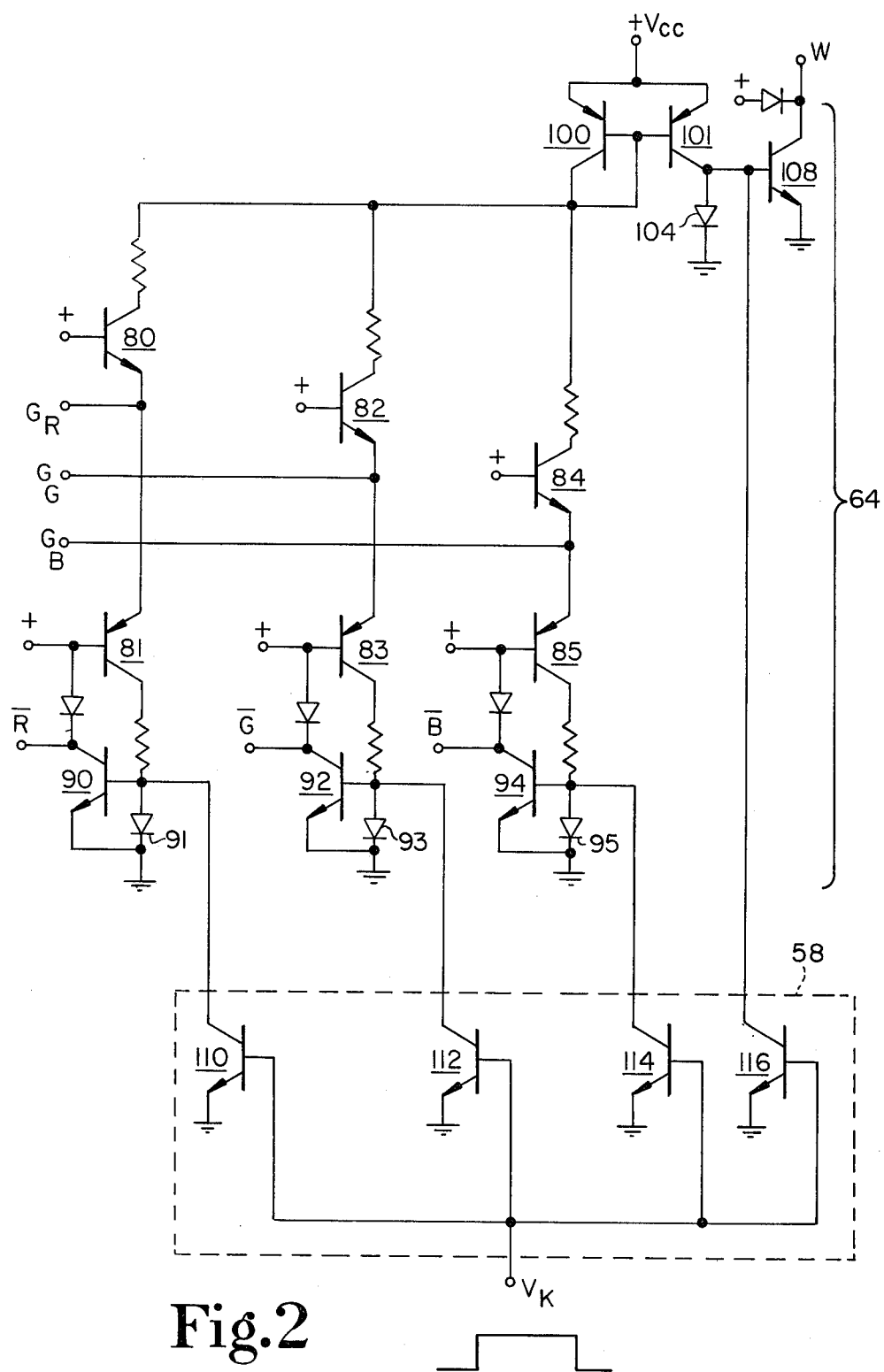
Figure 3:
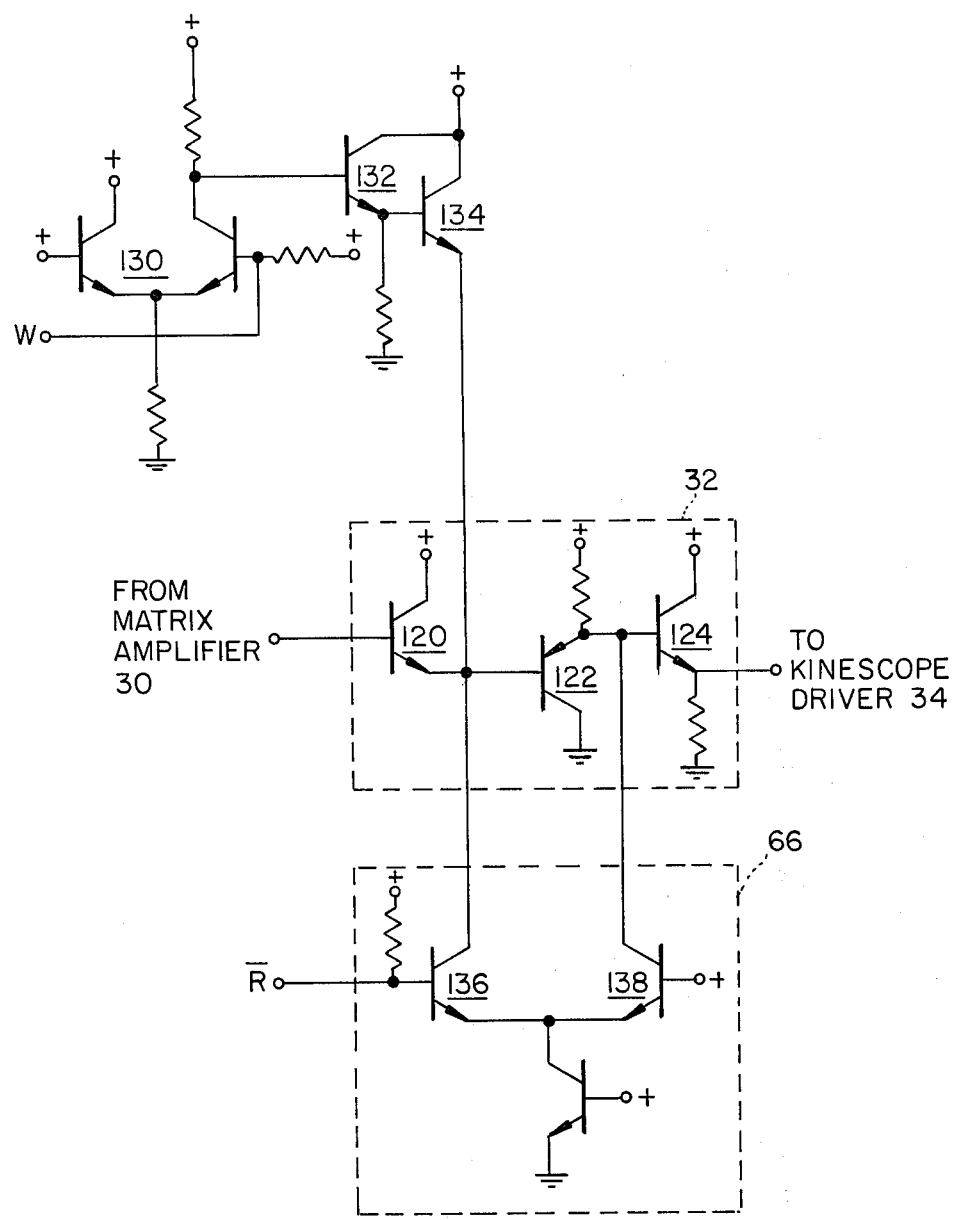

In the drawing:

FIG. 1 shows a black diagram of a portion of a color television receiver including apparatus according to the present invention; and FIGS. 2 and 3 show circuit details of portions of the arrangement of FIG. 1.

In FIG. 1, the chrominance component of a color television signal is supplied from a source 10 to a chrominance processor 12, for developing color difference signals Y-R, Y-G and Y-B which are respectively applied to red, green, and blue signal processors 20a, 20b and 20c. The luminance component of the television signal is supplied from a source 15 to a luminance processor 16, which includes luminance amplifying, clamping, and peaking circuits for developing an appropriately processed luminance output signal Y. The luminance signal is coupled to each of color signal processors 20a, 20b and 20c, where the luminance signal is combined with the respective color difference signals to produce output red, green and blue color image representative signals. These color output signals are applied to respective cathode electrodes 22a, 22b and 22c of a color image reproducing kinescope 25 for reproducing an image on the screen of the kinescope. In this example, kinescope 25 is of the self-converging, in-line gun type with a commonly energized grid 27 associated with each of the kinescope electron guns comprising cathodes 22a–22c.

Color signal processing networks 20a, 20b and 20c are similar in structure and operation. Therefore the following description of red color signal processing network 20a also applies to color processors 20b and 20c.

In network 20a, an input matrix amplifier 30 combines luminance signal Y with the Y-R color difference signal to produce an output red color signal, which is applied to a kinescope driver 34 via a coupling network 32. Driver 34 amplifies the red color signal to a level suitable for driving cathode 22a of kinescope 25. The brightness of a reproduced picture is determined by controlling the DC level of the color output signal from matrix amplifier 30. Brightness control is accomplished by means of a network including a viewer adjustable brightness control potentiometer 40 and a switching network 42. Switching network 42 receives a variable brightness control voltage $V_B$ from the wiper of potentiometer 40, a fixed DC reference voltage $V_R$, and picture interval keying signals $V_P$ which occur at the horizontal image scanning rate. Switch 42 operates in response to keying signals $V_P$ for coupling variable brightness control voltage $V_B$ to matrix amplifier 30 for brightness control purposes only during each horizontal image interval of the television signal. At all other times, voltage $V_B$ is replaced by reference voltage $V_R$, which causes a desired black reference voltage to be developed in the output signal from matrix 30 and in the output signal from kinescope driver 34. This black reference voltage is also produced from switch 42 during picture intervals when control 40 is approximately at a mid-range position. Additional details of this brightness control arrangement are found in U.S. Pat. No. 4,404,593 of R. L. Shanley, II, et al. titled "Brightness Control Circuit", incorporated by reference herein. The output of switch 42 is also applied to green and blue signal processors 20b and 20c in similar fashion.

The peak-to-peak amplitudes of the luminance and chrominance signals are controlled in response to a gain control signal generated by a network included a viewer adjustable potentiometer 44 and a signal translating network 45. A gain control voltage from the wiper of control 44 is coupled via a degenerated current mirror amplifier arrangement including transistors 46, 47 to other translating circuits within network 45, which develop a suitable variable gain control signal that is applied to gain control inputs of luminance processor 16 and chrominance processor 12. Additional details of gain control network 44, 45 are found in a copending U.S. patent application Ser. No. 296,865 of L. A. Harwood, et al. titled "Circuit for Linearly Gain Controlling a Differential Amplifier", incorporated herein by reference.

On-screen display of auxiliary characters (e.g., alphanumeric information) is accomplished by means of a system including a character signal source 60, a T.V. character generator 62, a translating network 64, and an on-screen display (OSD) switch 66 included in signal processor 20a. When auxiliary character signals to be displayed correspond to the number of the broadcast channel to which the receiver is tuned, for example, source 60 responds to signals derived from the channel tuning system of the receiver to develop a binary coded digital signal representative of the channel number to which the receiver is tuned. Signals from source 60 are applied to T.V. character generator 62 which is synchronized by horizontal (H) and vertical (V) deflection signals to cause the character information to be displayed in a particular portion of the kinescope viewing screen. Other information, such as the time of day, can also be supplied to generator 62 for suitable conversion to video signal display format.

Character generator 62 provides plural, suitably timed output signals $G_R$, $G_G$ and $G_B$ respectively corresponding to red, green and blue character signal information. These signals are supplied to a character signal translating network 64 which provides output "black drive" character switching signals $\overline{R}$, $\overline{G}$, $\overline{B}$ and an output "white drive" character switching signal W. Signals $\overline{R}$ and W are applied to O.S.D. switch 66 and to signal coupling network 32, respectively, in signal processor 20a. In similar fashion signal W is also applied to networks 20b and 20c, and signals G and B are respectively applied to networks 20b and 20c.

The OSD system is capable of producing several character colors during OSD intervals, including black and white, the primary colors, red, green and blue, and complementary colors yellow, cyan and magenta, by blanking and unblanking the outputs of appropriate combinations of red, green and blue signal processing networks 20a, 20b and 20c in accordance with the levels of signals $\overline{R}$, $\overline{G}$, $\overline{B}$ and W. Specifics of the OSD system operation will be discussed in connection with FIGS. 2 and 3. Detailed information concerning the operation of the OSD system is disclosed in a copending U.S. patent application Ser. No. 323,197 of R. L. Shanley, II, titled "Switching Circuit for Television Receivers On-Screen Display", incorporated herein by reference.

The receiver also incorporates an automatic kinescope bias (AKB) control system comprising a kinescope bias control network 36 of the type described in U.S. Pat. No. 4,263,622 of Werner Hinn, for example. Similar bias control networks are included in networks 20b and 20c. As described in detail in the Hinn patent, incorporated by reference herein, the AKB system operates during video blanking intervals following each vertical image retrace interval to measure and control the level of kinescope cathode black level current. The AKB interval typically corresponds to the first few horizontal line intervals after the end of the vertical retrace interval, during which time picture information is absent. The AKB interval includes a monitoring interval and a reference interval.

During the AKB interval, the output from kinescope driver 34 exhibits a black reference level produced in response to reference voltage $V_R$ associated with the brightness control network, as discussed, and video signal information in the kinescope driver output is absent. The latter result is produced by reducing the signal gain of luminance processor 16 and chrominance processor 12 to a minimum by means of a keyed transistor 50 coupled to gain control voltage translating network 45. Transistor 50 is keyed to conduct during the entire AKB interval in response to a keying signal $V_K$, and renders gain control voltage coupling transistor 47 in network 45 non-conductive by diverting base current from it, whereby the signal gains of signal processors 12 and 16 are reduced to approximately zero.

The black reference level from kinescope driver 34 is produced over the entire AKB interval. During the monitoring portion of the AKB interval, a positive pulse $V_G$ is applied to kinescope grid 27 with a sense for forward biasing the kinescope electron guns to conduct. The grid pulse cause a cathode output pulse to be induced by cathode follower action. The magnitude of the athode output pulse is proportional to the level of cathode black level current conducted by the kinescope. Kinescope bias control network 36 has an input coupled to the cathode signal coupling path, and operates in response to sampling signals $V_S$ for detecting the magnitude of the cathode output pulse, and for developing a bias control output voltage proportional to any deviation of the cathode pulse level from an expected level corresponding to correct cathode bias. The bias control voltage is applied to the kinescope driver with a sense for modifying the cathode bias to correct the deviation, thereby producing a desired cathode black level current level at or near kinescope cut-off.

Signals $V_G$, $V_S$, and $V_K$ associated with the operation of the AKB system, as well as signal $V_P$, are supplied from a timing signal source 52 in response to horizontal (H) and vertical (V) retrace blanking signals provided from deflection circuits 54 of the receiver. Circuits suitable for generating timing signals $V_K$ and $V_S$ and grid drive pulse $V_G$ are shown in the aforementioned Hinn patent. As indicated by the waveforms, signal $V_K$ corresponds to a positive pulse over an interval $T_1$ corresponding to the AKB interval, and grid drive signal $V_G$ corresponds to a positive pulse over an interval $T_2$ occupying a portion of AKB interval $T_1$.

The cathode bias control voltage developed by the AKB system can be distorted by unwanted signals when present in the cathode signal coupling path. Such unwanted signals, e.g., can be caused by false triggering of the OSD system during the AKB interval in response to noise and stray magnetic field voltages generated by the deflection circuits of the receiver, or in response to signals occurring during the retrace intervals such as may be associated with an auxiliary input signal source with which the receiver operates, as mentioned previously. The adverse effect of such unwanted signals on the operation of the AKB system is virtually eliminated by disabling the OSD system during the AKB intervals. This is accomplished by applying signal $V_K$, which encompasses the AKB interval, via an OSD DISABLE network 58 to a control input of translating network 64 of the OSD system. Signal $V_K$ prevents OSD translation network 64 from producing character representative output signals, as will now be discussed in greater detail with regard to FIG. 2.

FIG. 2 shows circuit details of OSD signal translating network 64, and OSD DISABLE network 58. Signals $G_R$, $G_G$ and $G_B$ from character generator 62 each correspond to a tri-state logic signal. Translating network 64 includes a tri-state logic circuit which: in a first logic state exhibits a high impedance and produces a level of +1.6 volts when no character information is to be displayed (i.e., when the kinescope is intended to respond normally to display broadcast video signals); in a second logic state exhibits a low impedance and produces a level of less than +0.8 volts when character information is to be displayed with a color other than black; and in a third logic state exhibits a low impedance and produces a level of greater than +2.4 volts when black character information is to be displayed.

Circuit 64 comprises complementary conductivity type emitter coupled, emitter input transistor pairs 80 and 81, 82 and 83, and 84 and 85 which respectively respond to character signals $G_R$, $G_G$ and $G_B$. Collector currents conducted by transistors 81, 83 and 85 are respectively replicated by means of current mirror circuits including transistor 90 and diode 91, transistor 92 and diode 93, and transistor 94 and diode 95. Character switching control signals $\overline{R}$, $\overline{G}$ and $\overline{B}$ are derived from the collector outputs of transistors 90, 92 and 94. The levels of signals $\overline{R}$, $\overline{G}$ and $\overline{B}$ are a function of the conductive state of associated current mirror transistors 90, 92 and 94 in response to the level of character signals $G_R$, $G_G$ and $G_B$. Collector currents conducted by transistors 80, 82 and 84 are combined and replicated by means of current mirror circuits including diode connected transistor 100 and transistor 101, and diode 104 and transistor 108. Character switching control signal W is derived from the collector output of transistor 108. The level of signal W is a function of the conductive state of current mirror transistor 108 in response to the character signals from generator 62. Translating circuit 64 is discussed in greater detail in a copending U.S. patent application Ser. No. 323,351 of R. L. Shanley, II, et al. titled "Translating Circuit for Television Receiver On-Screen Graphics Display Signals."

Network 58 comprises transistors 110, 112, 114 and 116 which respond to positive pulse $V_K$ and have collector outputs respectively coupled to "black drive" output transistors 90, 92, 94 and to "white drive" output transistor 108. When pulse $V_K$ is present during the AKB intervals, transistors 110, 112, 114 and 116 are rendered conductive and serve to maintain $\overline{R}$, $\overline{G}$, $\overline{B}$ and W output drive transistors 90, 92, 94 and 108 in a substantially non-conductive state corresponding to a condition wherein normal video signal information would be displayed by the kinescope. As noted earlier, however, normal video signal information is blanked during the AKB intervals. Thus the character signal drive transistors are rendered inoperative to produce black and white drive character signals in response to unwanted signals including spurious signals likely to be picked up by the often lengthy conductors coupling the OSD system to color processor 20a, whereby the OSD system is disabled and prevented from producing false character representative signals.

FIG. 3 shows circuit details of signal coupling network 32 and OSD switch 66 shown in FIG. 1.

Signal coupling network 32 comprises cascade connected emitter follower transistors 120, 122 and 124 connected between the output of matrix amplifier 30 and the input of kinescope driver 34. The "white drive" character control signal W is coupled to the emitter of transistor 120 in network 32 via a differential amplifier 130 and darlington-connected emitter follower transistors 132 and 134. Character control signal $\overline{R}$ is applied to OSD switch 66 which comprises differentially connected current steering switching transistors 136, 138.

As explained in detail in the aforementioned copending patent application of R. L. Shanley, II, Ser. No. 323,197, signal coupling transistors 120, 122 and 124 are rendered conductive in response to signals $\overline{R}$ and W in a normal video display operating mode of the receiver. At this time transistors 132, 134 are rendered non-conductive in response to signal W. Signal $\overline{R}$ renders transistor 136 conductive and transistor 138 non-conductive. At this time color signal processors 20b and 20c exhibit the same operating condition as color processor 20a.

During character display intervals, control signals $\overline{R}$ and W render video signal coupling transistor 120 non-conductive, whereby the output of matrix amplifier 30 is decoupled from the input of kinescope driver 34. Transistors 132 and 134 remain conductive whenever a character of a color other than black is to be displayed. A black character is produced whenever transistor 138, and the corresponding transistors in processors 20b and 20c, are rendered respectively conductive in response to signals $\overline{R}$, $\overline{G}$ and $\overline{B}$, at which time the outputs of the signal coupling networks, and thereby the outputs of color processors 20a, 20b and 20c, are blanked. Characters with colors white, red, green, blue, yellow, cyan and magenta can be displayed by unblanking the outputs of appropriate combinations of color processors 20a, 20b and 20c in response to control signals $\overline{R}$, $\overline{G}$ and $\overline{B}$.

During AKB intervals when the OSD system is disabled in response to signal $V_K$ as discussed previously, transistors 132, 134 are rendered non-conductive in response to signal W, and switching transistors 136 and 138 are respectively rendered conductive and non-conductive in response to signal R, whereby signal coupling transistors 120, 122 and 124 are rendered conductive as in the normal video display mode. At this time color signal processing networks 20b and 20c exhibit the same operating condition as network 20a.

It is noted that disabling the OSD system can be advantageously when accomplished at times other than during AKB intervals, such as during times when the black reference level of the video signal is sensed to develop a control voltage for controlling the DC level of the video signal, for example. For this purpose the receiver may include a keyed comparator and clamp arrangement for developing a control voltage representative of the difference between a reference voltage and the video signal black reference level associated with each horizontal blanking interval of the video signal. In an arrangement of this type, a convenient and desirable point for sensing the video signal black level is just prior to the kinescope driver stage (e.g., at the emitter of signal coupling transistor 120 shown in FIG. 3). A clamping comparator arrangement of this type is shown in U.S. Pat. No. 4,143,398 of L. A. Harwood, et al. In this instance disabling the OSD system during the black reference level intervals will present false character signals from distorting the video signal black reference level being sensed.

What is claimed is:

1. In a system for processing image representative video signals comprising an image component occurring during periodic image intervals and a blanking component occurring during periodic blanking intervals, said system including a kinescope for providing an image display in response to signals, including said video signals, applied thereto; apparatus comprising
   a source of periodic switching signals occurring during said blanking intervals;
   a character generator for providing auxiliary character representative signals to said kinescope during said video signal image intervals, said character generator being undesirably subject to producing false character signals during said blanking intervals; and
   control means coupled to said character generator and responsive to said switching signals for automatically rendering said character generator inoperative to produce character signals including said false character signals during said blanking intervals.

2. In a system for processing image representative video signals comprising image and blanking intervals, said system including a kinescope for providing an image display in response to signals, including said video signals, applied thereto; apparatus comprising:
   means for monitoring a given operating characteristic of said video processing system during prescribed periodic monitoring intervals;
   a source of periodic switching signals occurring during said monitoring intervals;
   a character generator for providing auxiliary character representative signals to said kinescope during said video signal image intervals, said character generator being undesirably subject to producing false character signals at times other than said video signal image intervals including said monitoring intervals; and
   control means coupled to said character generator and responsive to said switching signals for automatically rendering said character generator inoperative to produce character signals including false character signals during said monitoring intervals.

3. Apparatus according to claim 2, wherein
   said monitoring means comprises means operating during video signal image blanking intervals for deriving a signal representative of the level of current conducted by said kinescope during said blanking intervals.

4. In a video signal processing system including means for processing image representative video signals comprising image and blanking intervals, and a kinescope for providing an image display in response to signals, including video signals from said video processing means, applied thereto; apparatus comprising:
   means for monitoring a given operating characteristic of said video processing system during prescribed periodic monitoring intervals;
   a source of periodic switching signals occurring during said monitoring intervals;
   character generator means for supplying a first control signal to said video processing means for enabling said video signals to be coupled to said kinescope, and for supplying a second control signal to said video processing means for decoupling said video signals from said kinescope and for causing said kinescope to produce an auxiliary character display during said image intervals; said character generator means being undesirably subject to producing false second control signals at times other than said image intervals including said monitoring intervals; and
   control means coupled to said character generator means and responsive to said switching signals for automatically rendering said character generator means inoperative to produce said second control signal including false second control signals during said monitoring intervals.

5. Apparatus according to claim 4, wherein
   said control means causes said character generator means to produce said first control signal during said monitoring intervals.

* * * * *